Nov. 24, 1970 V. F. GUGLER 3,541,754
METHOD AND APPARATUS FOR PLACING ITEMS IN CONTAINERS
Filed Feb. 13, 1968 2 Sheets-Sheet 1
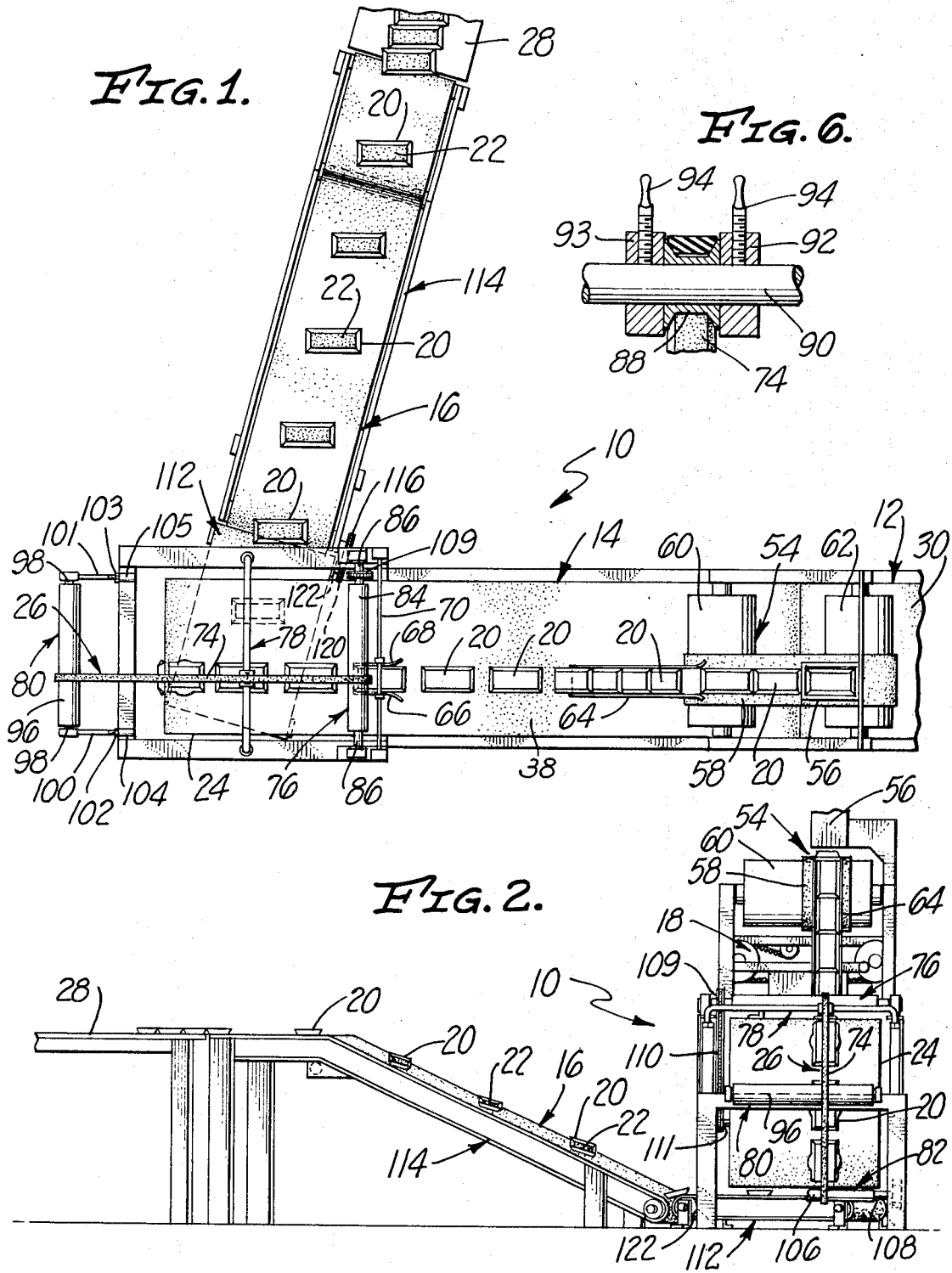
INVENTOR
VICTOR F. GUGLER
BY HIS ATTORNEYS
HARRIS, KIECH, RUSSELL & KERN

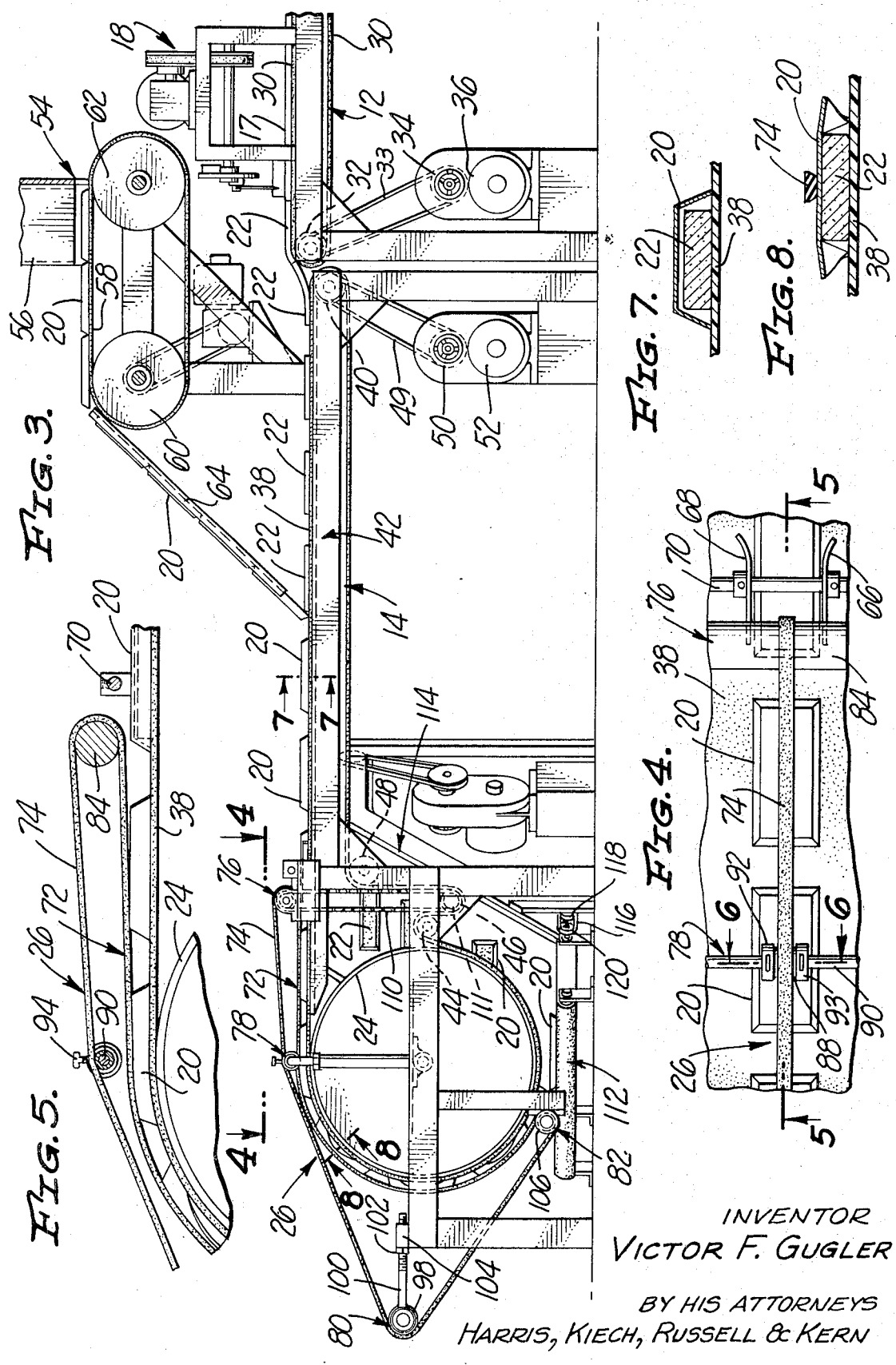

United States Patent Office 3,541,754
Patented Nov. 24, 1970

3,541,754
METHOD AND APPARATUS FOR PLACING ITEMS IN CONTAINERS
Victor F. Gugler, 8920 Helen Ave.,
Sun Valley, Calif. 91352
Filed Feb. 13, 1968, Ser. No. 705,137
Int. Cl. B65b *5/04, 63/00*
U.S. Cl. 53—35
14 Claims

ABSTRACT OF THE DISCLOSURE

A method and apparatus for transferring items moving along a conveyor belt into boxes including placing inverted boxes over the items as they move with the conveyor belt and vertically compressing the boxes to engage and hold the items in place therein as the boxes move with the conveyor belt around a drum from the inverted to an upright position for transfer from the conveyor belt.

---

The present invention relates to improved methods and apparatus for transferring items moving along a conveyor belt into boxes and, more specifically, to such methods and apparatus which are ideally suited for use in the processing of bakery products.

Today, breakfast rolls and the like are commonly sold as precooked items in individually wrapped boxes or containers. The boxes are usually aluminum or cardboard or some other paper product covered with aluminum foil or other suitable coating which permits the housewife to just remove an outer protective wrapping, heat, and serve the rolls from the box. Alternatively, the housewife may serve the rolls cold.

Heretofore, the mass production of such rolls has been relatively slow, inefficient, and expensive requiring the use of several workmen. For example, during the mass production of breakfast rolls, a spiral strip of dough is formed on a conveyor belt and seevred to form sections upon which baking will form individual rolls. After cutting of the strip, workmen standing by the conveyor belt separate the sections, pick them up, and carefully space them in the heat and serve boxes. The boxes are then placed on bake trays and transported to ovens where the rolls are baked. The boxes containing the baked rolls are then wrapped and shipped for distribution and ultimate purchase by the housewife.

In the method just described, the separating, picking up, and spacing of dough sections in the heat and serve boxes is a slow, tedious, and expensive process requiring many workmen if any degree of significant production capacity is to be achieved. Unfortunately, the inefficiency of the process results in relatively high production costs which are ultimately passed on to the housewife.

In view of the foregoing, it is a general object of the present invention to provide improved methods and apparatus which are particularly suited to use by bakeries and which will materially improve the efficiency and speed with which heat and serve as well as other bakery products can be mass produced.

With regard to the above, it is another and more specific object of the present invention to provide a method wherein and apparatus whereby individual items, such as dough sections, may be automatically and rapidly transferred from a moving conveyor belt into open boxes for further processing.

A further object of the present invention is to provide a method wherein and apparatus whereby inverted boxes are first placed over items moving with a conveyor belt and then slightly compressed to hold the items in place therein as the boxes move with the conveyor belt around a drum from the inverted to an upright position for transport from the conveyor belt.

Still another object of the present invention is to provide apparatus of the foregoing character including an arcuate guide means for extending from above to below the drum and for engaging the bottoms of and compressing the boxes as they move with the conveyor belt around the drum to the upright position.

A still further object of the present invention is to provide apparatus of the foregoing character wherein the guide means comprises a relatively narrow resilient band and means for tensioning the band to exert a force on the outer surface of the conveyor belt as it passes over the drum to thereby firmly hold the boxes against the drum and the items in place therein as the boxes move to the upright position.

Still another object of the present invention is to provide apparatus of the foregoing character which includes means for automatically spacing the items along the conveyor belt prior to covering by the inverted boxes.

The foregoing as well as other objects and advantages of the present invention may be more clearly understood by reference to the following detailed description when considered with the drawings which, by way of example only, illustrate one form of method and apparatus embodying the features of the present invention.

In the drawings:

FIG. 1 is a top view of apparatus for automatically placing items moving along a conveyor belt into open boxes and embodying the features of the present invention;

FIG. 2 is a front view of the apparatus illustrated in FIG. 1;

FIG. 3 is a slightly enlarged side view of the apparatus illustrated in FIG. 1;

FIG. 4 is a fragmentary top view taken along the line 4—4 in FIG. 3 and illustrating the manner in which inverted boxes are directed along a conveyor to structure for guiding the boxes around a large drum in the apparatus;

FIG. 5 is a fragmentary sectional side view taken along the line 5—5 in FIG. 4 and illustrating an upper portion of the box guiding structure.

FIG. 6 is a fragmentary sectional view taken along the line 6—6 in FIG. 4 illustrating one of the upper supports in the box guiding structure;

FIG. 7 is a fragmentary sectional view taken along the line 7—7 in FIG. 3 illustrating an inverted box over an article moving along the conveyor prior to reaching the large drum; and FIG. 8 is a fragmentary sectional view taken along the line 8—8 in FIG. 3 and illustrating an inverted box over an article as the article passes with the conveyor around the large drum to an upright position for transport from the conveyor.

In the drawings, the apparatus for transferring items moving along a conveyor belt into open boxes is represented generally by the numeral 10 and comprises three separate conveyors 12, 14, and 16. Generally speaking, conveyor 12 functions to transport one or more strips 17 of bakery dough to a cutter 18 which severs the strip or strips into sections. The second conveyor 14 has a front end adjacent the rear end of the conveyor 12 and the cutter 18 such that as the strip or strips of bakery dough are severed into sections, the sections fall onto the second conveyor for transport to the third conveyor 16.

While moving toward the third conveyor 16, inverted boxes 20 are placed on top of one or more of the sections of bakery dough, hereinafter referred to as bakery items 22. The boxes 20 move with the second conveyor 14 around a drum 24 until the direction of movement of the second conveyor is reversed and the boxes assume an upright position with the bakery items 22 placed therein.

To prevent the bakery items 22 from moving relative to the second conveyor 14 while the boxes 20 are turned over, a guide means 26 extends part way around the drum 24. The guide means 26 engages the bottoms of the boxes 20 and slightly compresses the sidewalls thereof such that bottoms engage and hold the bakery items in place as they move with the boxes around the drum 24. Upon assuming the upright position, the boxes 20 are transferred automatically from the second conveyor 14 by the third conveyor 16 to a stationary platform 28 for further processing of the bakery items within the associated bakery. For example, the individual boxes may be arranged on baking trays, placed in ovens for baking the bakery items, removed, and wrapped for shipment to retail outlets for purchase by the general public.

Even from the foregoing brief description, it is appreciated that the apparatus of the present invention embodies a method of operation which is eminently more efficient than prior manual processes for transferring bakery items from a conveyor to open boxes. Moreover, being substantially automatic the apparatus and methods of the present invention eliminate the need for several workmen and thereby significantly reduce the labor costs associated with the production of various types of bakery products. Furthermore, the speed with which bakery items may be boxed is much increased with the methods and apparatus of the present invention and hence the potential output of bakeries producing breakfast rolls and the like may be significantly increased with a corresponding cost savings to the ultimate consumer.

More particularly, in the illustrated form of the apparatus 10, the conveyor 12 comprises a conventional conveyor belt 30 (only the rearmost end of which is shown) for moving around a drum or roller 32 under the cutter 18. The conveyor belt 30 moves the strip 17 of bakery dough rearwardly therealong under the cutter 18 for repeated severing into bakery items 22. In this regard, the drum 32 and hence conveyor belt 30 is driven by a drive belt 33 extending between and over pulleys on the drum and in a conventional variable speed drive 34 for a motor 36.

The cutter 18 may also be of a conventional form such as the well known guillotine type of bakery product cutter or it may be of the improved form described in the copending patent application Ser. No. 705,136 filed Feb. 13, 1968. In any event, the cutter 18 is stationed over the top of the conveyor belt 30 and functions to repeatedly cut the strip 17 of bakery dough into separate sections to form the individual bakery items 22 for transfer to the second conveyor 14.

Like the first conveyor 12, the illustrated form of the second conveyor 14 comprises a conventional continuous conveyor belt 38 extending between and around a drum 40 and the drum 24. The drums 40 and 24 are mounted fore and aft on a support frame 42 for rotation about their central axes which lie in horizontal planes. The radius of the drum 24 is large when compared with the length of the boxes or with the diameter of the drum 40. Due in part to the size of the drum 24, additional horizontal rollers 44, 46, and 48 supported by the frame 42 are employed adjacent the drum to guide the conveyor belt 38 therearound and between the drums 24 and 40 in a conventional manner. The drum 40 and hence the forward end of the conveyor 14 lies immediately adjacent, parallel to and slightly below the rear of conveyor belt 30. By such positioning, the bakery items 22 formed by operation of the cutter 18 move with and to the rear of the conveyor belt 30 and fall or naturally migrate as a spaced series downward onto the conveyor belt 38 (see FIG. 3).

The automatic spacing of the bakery items 22 is caused by the speed differential between the conveyor belts 30 and 38. In this regard, the conveyor belt 38 is driven by movement of a drive belt 49 extending between and over pulleys connected to the drum 40 and in a conventional and variable speed drive 50 for a motor 52. By selective control of the variable speed drive 50, the speed of the conveyor belt 38 may be set at a value higher than the speed with which the conveyor belt 30 advances the bakery items therealong. Thus, while the bakery items are closely adjacent each other at the rear of the conveyor belt 30, they are carried at a higher speed away from the belt 30 by the conveyor belt 38 and hence assume a predetermined spacing on the belt 38 corresponding to the speed difference between the belts. By selective control of the speed difference through the variable speed drives 34 and 50 the spacing of the bakery items may be regulated as desired, as for example, when different bakery items are being processed, e.g., strudel and cinnamon or other breakfast rolls. Thus, in the apparatus 10, the bakery items 22 automatically separate themseleves from each other and do not require assistance of workmen for the same operation.

The spacing of the bakery items along the conveyor belt permits the open boxes 20 to be easily placed over one or more of the bakery items 22. In the illustrated form of the apparatus 10 wherein a strudel or stollen is being formed, each box is placed over a different stollen. It should be understood, however, and particularly in the case of cinnamon rolls or other breakfast rolls, that the boxes may be placed over a plurality of such bakery items.

In accordance with the present invention, the boxes 20 are placed upside down over the bakery items 22 as they move along the top of the conveyor belt 38. This may be done by hand but preferably by a mechanism 54 for automatically placing the boxes over a like number of bakery items. In the illustrated form of the apparatus, the mechanism 54 comprises a vertical chute 56 for receiving a stack of inverted boxes of a shallow pan variety having resilient sidewalls, such as an aluminum foil covered cardboard box. The chute 56 is supported over a relatively short continuous conveyor belt 58 supported on and extending around a pair of drums 60, 62 to advance the inverted boxes 22 in a rearward direction toward the top of an inclined slide 64. The lower end of the slide 64 is immediately adjacent the top of the conveyor belt 38. Thus, as the inverted boxes 20 move down the slide 64, rear lips of successive boxes engage the top surface of the conveyor belt 38 between bakery items 22, are drawn from the slide over successive ones of the bakery items, and travel with the conveyor belt 38 toward the drum 24. Thus, the mechanism 54 provides means for automatically placing inverted boxes one-by-one over successive bakery items or groups of bakery items advancing along the conveyor belt 38.

Once the inverted boxes 20 are placed over the bakery items 22, they are directed in a spaced series into the guide means 26. The means for providing such direction may take various forms. In the illustrated embodiment of the apparatus 10, however, such means includes a pair of horizontal, laterally spaced guide arms 66, 68 supported on a crossbar 70 extending over the top of the conveyor belt and connected to the frame 42. The arms 66 and 68 extend in the direction of the conveyor belt 38 on opposite sides of the guide means 26 with forward ends of the arms 66 and 68 being curved outward to provide an enlarged opening for receiving the rear end of each box 20 and for directing the boxes in a uniform line into the guide means 26.

As previously indicated, the guide means 26 upon receiving the boxes holds each individual box tightly to the outer surface of the conveyor belt 38 as it passes around the drum 24. In fact, the guide means 26 slightly deforms the sidewalls of the boxes such that the bottoms thereof hold the bakery items 22 in place within the boxes while they move from the inverted position on top of the drum to an upright position at the bottom of the drum for automatic transfer to the third conveyor 16.

Generally speaking, the guide means 26 comprises an arcuate member 72 extending from a top portion of the drum 24 around a rearmost portion thereof to a bottom of the drum. The guide means 26 may be spaced slightly from or ride along the conveyor belt 38 to tightly engage the bottoms of the boxes 20 and compress same as illustrated in FIG. 8, thereby holding the bakery items 22 tightly in place as they move with the conveyor belt 38 around the drum 24 from the inverted to upright positions.

More particularly, in the illustrated embodiment, the guide means 26 comprises a continuous band 74 of resilient slightly elastic material such as rubber, and a plurality of support elements 76, 78, 80, and 82 within the loop defined by the band. Generally speaking, the support elements support the band 74 such that it extends in the direction of the conveyor belt 38 from a location forward and above the drum 24 rearwardly and downwardly to a point adjacent the lowermost surface of the drum and then upwardly along the outer surface of the drum and back to the forward location.

In the illustrated embodiment, and as most clearly represented in FIGS. 1, 3, 4, and 5, the forwardmost portion of the band 74 is supported by and extends around the element 76 which comprises a cylindrical roller 84 parallel to the axis of and forward of the drum 24 above the top surface thereof. Stub shafts 86 extend from opposite ends of the roller 84 and are supported by the frame 42 such that the roller is free to rotate about its horizontal longitudinal axis.

From the roller 84, the band 74 extends rearward to and over the element 78, which comprises a pulley 88 supported for turning on a cylindrical crossbar 90 connected to the frame 42. As illustrated most clearly in FIGS. 4 and 6, the pulley 88 preferably is of a V-groove type and is secured on the crossbar 90 by a pair of bushings 92, 93 held in place by set screws 94. The band 74 may also include inwardly inclined edges as illustrated in FIG. 6 to prevent it climbing out of the pulley 88 during operation of the apparatus.

From the pulley 88, the band 74 extends rearward of the drum and over the element 80 comprising a cylindrical roller 96 extending parallel to the axis of the drum 24. Stub shafts 98 extending from opposite ends of the roller are mounted for turning in bearings supported on the forward ends of a pair of laterally spaced, parallel and horizontal rods 100 and 101. The rear ends of the rods 100 and 101 are threaded to receive nuts 102 and 103 are supported for axial movement in sleeves 104 and 105 connected to the frame 42. Thus arranged, a turning of the nuts 102 and 103 causes the rods 100 and 101 to move axially in and out of the sleeves thereby controlling the tension in the band 74 and as will be described, the pressure of the band against the conveyor belt 38 as it passes around the drum 24.

From the roller 96, the band 74 passes downwardly to and around the element 82 which comprises a cylindrical roller 106 extending parallel to and forward of the axis of the drum 24 adjacent the bottommost portion thereof. Stub shafts 108 extending from opposite ends of the roller are supported for turning in bearings secured to the frame 42 to permit the roller 106 to turn freely relative to the frame.

Because of the positioning of the rollers 84 and 106, the band 74 in passing around the roller 106 and to the roller 84 bears against the outer surface of the conveyor belt 38 passing over the rear portion of the drum 24. By turning the nuts 102 and 103 to tension the band 74, the portion of the band engaging the conveyor belt 38 exerts an inward radial force on the drum 24, and bears tightly against the conveyor belt 38 passing over the drum. Thus, as the boxes are fed between the band 74 and the conveyor belt 38, the band bears tightly on the bottoms of the boxes to hold them in place on the moving conveyor belt and the boxes move with the belt around the drum from an inverted position at the top of the drum to an upright position at the bottom of the drum for transfer to the third conveyor 16.

It should be noted that the band 74 is preferably of a thickness substantially less then the width of the boxes 20, Thus dimensioned, the band 74 and the inward forces exerted thereby on the boxes are sufficient to deform the sidewalls of the boxes without meeting significant resistance of the reinforced corners thereof. This is illustrated most clearly in FIG. 8 for a box moving around the drum 24 and should be compared with FIG. 7 which illustrates the condition of a box before reaching the drum 24 and the guide means 26. As represented in FIG. 8, the force of the band on the bottom of the box deforms the sidewalls of the box to such a degree that the bottom of the box is depressed and engages the top of the bakery item 22 within the box to hold it firmly against the conveyor belt as it passes around the drum 24 to the upright position.

Although the guide means 26 has been described as including a single band 74, multiple bands may be employed, particularly when more than one series of boxes are to be filled. Also, a plurality of bands may be grouped side-by-side in the guide means 26 to provide a reinforced band structure and to insure continued operation despite possible breakage of one of the bands.

Because of the bearing mounts for the rollers and pulley of the support elements 76, 78, 80, and 82, the band 74 is adapted to move with the conveyor belt 38 as it passes over the drum 24. In particular, the friction developed between the conveyor belt 38 and the band 74 through the boxes 20 may be sufficient to pull the band with the conveyor belt. Alternatively, and as illustrated, the band 74 may be positively driven from the conveyor belt 38 by means of a drive chain 110 passing over a sprocket 109 connected to the roller 84 and driven from a sprocket 111 on the guide roller 46 for the conveyor belt. In either case, the band 74 continuously advances with the conveyor belt 38.

As previously indicated, from the guide means 26 the upright boxes 20 with the bakery items 22 therein automatically pass to the third conveyor 16 and hence to the stationary platform 28 for further processing. The third conveyor 16 is illustrated most clearly in FIGS. 1–3 and comprises a conventional horizontally extending, continuous conveyor belt structure 112 immediately below the drum 24 and an upwardly inclined continuous conveyor belt structure 114 leading from the conveyor belt structure 112 to the stationary platform 28. The inclined conveyor belt structure 114 is driven by a conventional motor drive while the horizontal conveyor belt structure is driven from the inclined conveyor by means of a chain drive 116 between the lower drum 118 for the inclined conveyor and a sprocket 120 connected to a horizontal drum 122 for the conveyor belt structure 112. Preferably, the conveyor belt structure 112 extends at a forward angle relative to the axis of the drum 24 such that the boxes 20 in leaving the guide means 26 slide directly onto the conveyor 112 which is moving with a component of forward velocity to carry the boxes away from the second conveyor 14. The transverse arrangement of the conveyor 112 permits the boxes 20 to be brought from under the drum 24 automatically rather than requiring a workman to physically transport the boxes from that point to the next station in the bakery process. The outermost end of the conveyor belt structure 112 is immediately adjacent the bottom of inclined conveyor belt structure 114 as illustrated most clearly in FIG. 2. Thus, the boxes 20 automatically pass from the conveyor belt structure 112 to the inclined conveyor belt structure 114 and upwardly to the platform 28 for further processing.

From the foregoing, it is appreciated that the apparatus and process of the present invention provides means whereby articles moving along a conveyor belt may be rapidly and automatically placed in boxes without requiring workmen to separate the articles and to subsequently lift them from the conveyor belt into boxes for further processing. Rather, the apparatus automatically places the items under inverted containers of boxes which are subsequently automatically inverted without disturbing the items and transported from the conveyor belt to a stationary table for further processing. This substantially improves the speed with which the articles may be processed, the efficiency of the transporting operation, and eliminates the need for several workmen, thereby reducing the processing cost and ultimate expense of the product to the consumer.

While a particular form of apparatus and method have been described in some detail herein, changes and modifications may be made in the illustrated form without departing from the spirit of the invention. It is therefore intended that the present invention be limited in scope only by the terms of the following claims.

I claim:
1. In combination:
   first conveyor means for transporting a strip of bakery product at a predetermined speed toward a cutter means;
   cutter means for severing said strip into sections;
   second conveyor means including first and second drum means and a continuous conveyor belt passing over and between said first and second drum means, said first drum means being adjacent said cutter means whereby said sections of bakery product are transferred automatically to said conveyor belt and move therewith toward said second drum means;
   means driving said conveyor belt at a speed greater than said predetermined speed whereby said sections in transferring to said conveyor belt are spaced one from another and such that inverted boxes having resilient sidewalls may be placed over one or more of said sections as they move with said conveyor belt; and
   arcuate guide means extending in the direction of said conveyor belt over and around said second drum means between a top and bottom portion thereof for engaging bottoms of said boxes and collapsing the sidewalls thereof to hold said sections in place within said boxes as they move with said conveyor belt around said second drum means to an upright position for transport from said second conveyor means.

2. The combination of claim 1 further including means for adjusting the speed of said conveyor belt relative to said predetermined speed.

3. The combination of claim 1 further comprising means for placing open boxes having resilient sidewalls upside down over one or more of said sections as they move with said conveyor belt.

4. The combination of claim 1 further comprising means over said conveyor belt between said first and second drum means for directing said inverted boxes and sections contained therein to said guide means.

5. The combination of claim 1 wherein said guide means comprises:
   a continuous band; and
   support means engaging portions of an inner surface of said continuous band for directing said continuous band from above a top portion rearward to below a bottom portion of said second drum means and freely between said top and bottom portions around and against an outer surface of said conveyor belt over said second drum means to bear against said bottoms of said boxes.

6. The combination of claim 5 wherein said continuous band is formed of a resilient material and is narrower than the width of said boxes and wherein said support means comprises means for tensioning said continuous band to urge same tightly against said conveyor belt passing over said second drum means.

7. The combination of claim 5 wherein said second drum means has a radius which is large when compared with the length of said boxes.

8. The combination of claim 5 wherein one of said support means includes a rotatable shaft and wherein said combination further includes drive means for turning said shaft to advance said continuous band in synchronism with said conveyor belt.

9. The combination of claim 5 wherein said support means include roller means for guiding said band whereby said conveyor belt and band move together over said second drum means.

10. The combination of claim 1 further comprising third conveyor means extending below said second drum means for receiving said upright boxes from said guide means and for transporting same from said second conveyor means.

11. The combination of claim 10 wherein said third conveyor means comprises:
   a second continuous conveyor belt below said second drum means and extending in a forward direction at an angle to the horizontal axis of said second drum means.

12. The combination of claim 11 wherein said third conveyor means further comprises a moving ramp for receiving said upright boxes from said second continuous conveyor belt and for transporting same upward to a stationary platform.

13. Apparatus for transferring bakery dough sections from a moving conveyor belt into shallow pans comprising:
   first and second drum means;
   a continuous conveyor belt passing over and between said first and second drum means for advancing dough sections spaced along said belt toward said second drum means with inverted shallow pans having resilient sidewalls over said sections;
   a continuous band of resilient material, said band being narrow relative to the width of said pans;
   support means engaging portions of an inner surface of said continuous band for directing said continuous band from above a top portion rearward to below a bottom portion of said second drum means and freely between said top and bottom portions around and immediately adjacent an outer surface of said conveyor belt over said second drum means to bear against central portions of bottoms of said pans as they travel on said conveyor belt around said second drum means;
   means for advancing said conveyor belt;
   means for driving said band in synchronism with said conveyor belt; and
   manually controllable means for presetting the tension in said band such that the pressure exerted thereby on said bottoms of said pans as they travel between said conveyor belt and said band around said second drum means is sufficient to just deform said sidewalls and force said bottoms lightly against tops of said dough sections to thereby hold said dough sections in place in said pans without deformation as said pans move with said conveyor belt around said second drum means.

14. A method of transferring bakery dough sections from a moving conveyor belt into pans, comprising the steps of:
   placing shallow pans with resilient sidewalls upside down over one or more dough sections as they move with and along a top of the conveyor belt whereby closed bottoms of said pans are facing upwardly;
   directing said conveyor belt along a curved path until its direction of movement is substantially reversed;

pressing toward said conveyor belt on central portions of said closed bottoms of said pans just sufficient to deform said sidewalls and force said bottoms lightly against tops of said dough sections to hold said dough sections in place in said pans without deformation as said pans move with said conveyor belt along said curved path and until said pans are in an upright position; and directing said upright pans with dough sections therein from said conveyor belt.

References Cited

UNITED STATES PATENTS

| | | | |
|---|---|---|---|
| 2,763,110 | 9/1956 | Stuart | 53—243 |
| 2,917,882 | 12/1959 | Buck | 53—243 X |
| 3,279,927 | 10/1966 | Reid | 53—243 X |
| 3,316,688 | 5/1967 | Niederer et al. | 53—243 X |
| 3,343,337 | 9/1967 | Dalle Vacche | 53—243 X |

THERON E. CONDON, Primary Examiner

R. L. SPRUILL, Assistant Examiner

U.S. Cl. X.R.

53—123, 243; 107—7